United States Patent [19]

Khalifa

[11] Patent Number: 5,539,561
[45] Date of Patent: Jul. 23, 1996

[54] EYEGLASS HAVING REMOVABLE TEMPLE/LENS CONNECTOR

[75] Inventor: Aly G. Khalifa, Raleigh, N.C.

[73] Assignee: Performance, Inc., Chapel Hill, N.C.

[21] Appl. No.: 380,846

[22] Filed: Jan. 27, 1995

[51] Int. Cl.$^6$ .................................................. G02C 5/00
[52] U.S. Cl. .......................................... 351/140; 351/116
[58] Field of Search ............................ 351/41, 110, 116, 351/140, 141, 158

[56] References Cited

U.S. PATENT DOCUMENTS

| | | | |
|---|---|---|---|
| 1,294,390 | 2/1919 | Burke . | |
| 3,233,249 | 2/1966 | Baratelli et al. | 2/14 |
| 3,233,250 | 2/1966 | Jonassen | 2/14 |
| 3,476,466 | 11/1969 | Hopkins | 351/115 |
| 3,705,760 | 12/1972 | Langendorfer et al. | 351/44 |
| 4,153,347 | 5/1979 | Myer | 351/90 |
| 4,564,272 | 1/1986 | Rinnooy Kan | 351/153 |
| 4,865,437 | 9/1989 | Neuhaus | 351/116 |
| 4,878,749 | 11/1989 | McGee | 351/52 |
| 4,978,209 | 12/1990 | Ohba | 351/153 |
| 5,032,017 | 7/1991 | Bolle et al. | 351/116 |
| 5,059,017 | 10/1991 | Bennato | 351/121 |
| 5,359,370 | 10/1994 | Mugnier | 351/116 |
| 5,387,949 | 2/1995 | Tackles | 351/140 |

FOREIGN PATENT DOCUMENTS

| | | |
|---|---|---|
| 0571765A1 | of 1993 | Germany . |
| 626533 | 9/1949 | United Kingdom . |

*Primary Examiner*—William L. Sikes
*Assistant Examiner*—James A. Dudek
*Attorney, Agent, or Firm*—Rhodes, Coats & Bennett

[57] ABSTRACT

An eyeglass including a lens and a temple/lens connector. The lens includes a peripheral side edge and a notch formed in the side edge. The notch is defined by an upper tang, a lower tang, and a seat edge formed therebetween. An aperture is formed in the lens. The temple/lens connector includes a base member having a first end, a second end, and an interior surface. The cam structure is provided proximate the first end and project from the interior surface. The cam structure is rotatable within the aperture and arranged and configured to secure the base member to the lens when rotated into a locked position and to allow the removal of the base member from the lens when rotated into an unlocked position.

The cam structure may include a shaft having one end secured to the interior surface of the base member and a head formed on the other end of the shaft. The head is adapted to pass through the aperture when the cam structure is in the unlocked position, and includes extensions arranged and configured to abut against a portion of the surface of the lens opposite the base member and prohibit removal of the cam structure from the aperture when the cam structure is in the locked position. The cam structure is rotatable between the locked and unlocked positions about an axis defined within the aperture of the lens.

The temple/lens connector may further include clip structure formed proximate the second end of the base member. The clip structure arranged and configured to receive a portion of the peripheral side edge of the lens. The clip structure may include an abutment and a lip extending from the abutment and spaced from the base member.

31 Claims, 3 Drawing Sheets

EYEGLASS HAVING REMOVABLE TEMPLE/LENS CONNECTOR

FIELD OF THE INVENTION

The present invention is related to eyeglasses, and, more particularly, to lightweight eyeglasses having relatively detachable components.

BACKGROUND OF THE INVENTION

In recent years, eyeglasses and sunglasses designed for athletic activities have received tremendous popularity. Typically, these eyeglasses are designed to protect the wearer's eyes from wind, flying objects, and, in the case of sunglasses, sunlight. While various athletic eyeglass designs have provided different styles and combinations of features, all such eyeglass designs have attempted to maximize certain common features and characteristics.

Perhaps foremost among these characteristics, eyeglasses designed for athletic activities should be as light as possible without sacrificing the required strength and resilience. To lighten the eyeglasses, polycarbonate lenses have been developed. Typically, at least a top frame member is provided for securing the temple and ear stems to the lens. The provision of a top frame adds undesirable weight and limits upward visibility.

Athletic style eyeglasses preferably have a wrap-around design. The wraparound design provides greater protection from glare above, below, and to the side of the wearer's head, as well as greater protection from wind and objects in the environment such as dirt and projectiles.

A very desirable feature in eyeglasses intended for athletic use is provision for relative detachability of the several components that make up the eyeglasses. In particular, it is desirable to be able to remove and replace the lens, the temples, the ear stems (if a two-piece temple is used), and the nose piece. This is because the several components may each have different expected work lives. In particular, the polycarbonate lenses are prone to scratching and may require replacement more frequently than the other components. It is also important that the components be easily detachable without damage to or risk of damage to any of the components.

Each of the above described features of athletic style eyeglasses must be provided for without unduly compromising the aesthetic functionality of the eyeglass and the cost effectiveness of its manufacture. To this end, it is desirable to have an eyeglass construction which lends itself to modification of the lens shape and frame configuration.

Thus, there is a need for an eyeglass which is light and strong, and which provides for easy detachability between its various components. Moreover, there is a need for such an eyeglass which allows for great variability of the configuration of the lens and the means for securing the ear stems to the lens such that it lends itself to a wide variety of styles. Further, there is a need for such an eyeglass which is cost effective to manufacture.

SUMMARY OF THE INVENTION

The present invention is directed to a temple/lens connector for removably securing a temple to an eyeglass lens, the eyeglass lens having an aperture formed therein and a peripheral side edge. The temple/lens connector includes a base member having a first end, a second end, and an interior surface. A cam structure is provided proximate the first end and projects from the interior surface. The cam structure is rotatable within the aperture and is arranged and configured to secure the base member to the lens when rotated into a locked position and to allow the removal of the base member from the lens when rotated into an unlocked position.

The cam structure may include a shaft having one end secured to the interior surface of the base member, and a head formed on the other end of the shaft. The head is adapted to pass through the aperture when the cam structure is in the unlocked position. Further, the head includes extensions arranged and configured to abut a portion of the surface of the lens opposite the base member and prohibit removal of the cam structure from the aperture when the cam structure is in the locked position. Preferably, the cam structure is rotatable between the locked and unlocked positions about an axis defined within the aperture of the lens.

The aforedescribed temple/lens connector may further include a clip structure formed proximate the second end of the base member. The clip structure is arranged and configured to receive a portion of the peripheral side edge of the lens. The clip structure may include an abutment and a lip extending from the abutment and spaced from the base member. Further, a cam structure including a shaft extending from the base member may be provided in combination with the clip structure such that the distance between the shaft and the abutment is substantially the same as the distance between the aperture and at least a portion of the peripheral edge of the lens pane adjacent the abutment when the cam structure is in the locked position. Preferably, the abutment has a length greater than the length of a notch formed in the periphery of the lens.

The aforedescribed temple/lens connector may further include means formed on the second end of the base member for pivotally securing the temple.

The present invention is further directed to an eyeglass lens for use with a temple/lens connector, the temple/lens connector including a base member having the aforesaid cam structure proximate a first end and a clip structure proximate a second end. The eyeglass lens includes a peripheral side edge and a notch formed in the side edge. The notch is defined by an upper tang, a lower tang, and a seat edge formed therebetween. The notch is arranged and configured to engage the clip structure of the temple/lens connector. The eyeglass lens of the present invention is further provided with an aperture formed therein. The aperture is arranged and configured to secure the base member to the lens when the base member is rotated into a locked position and to allow the removal of the base member from the lens when the base member is rotated into an unlocked position. The seat edge of the aforedescribed notch may include a straight, substantially vertical edge between the upper and lower tangs. Preferably, the upper tang extends farther than the lower tang from the aperture whereby the upper tang arrests upward movement of the base member and the lower tang frictionally resists downward movement of the base member.

Alternatively, the seat edge of the aforedescribed notch may include a curvilinear edge extending substantially vertically between the upper and lower tangs. Preferably, the upper tang extends farther than the lower tang from the aperture whereby the upper tang arrests upward movement of the base member and the lower tang frictionally resists downward movement of the base member.

The present invention is further directed to an eyeglass including the aforesaid lens, a temple, and the aforesaid temple/lens connector.

The present invention is further directed to a lens support assembly including a temple/lens connector as described above and a temple. The temple/lens connector includes means formed on the second end of the base member for pivotally securing the temple. Preferably, the temple includes a connector piece and an ear piece.

It is an object of the present invention to provide an eyeglass for athletic use which is light and relatively strong and resilient.

It is an object of the present invention to provide an eyeglass as described above having relatively detachable components.

It is an object of the present invention to provide such an eyeglass wherein the various components may be detached from one another in an uncomplicated manner and without damage or risk of damage to any of the various components.

It is an object of the present invention to provide an eyeglass as described above which may be cost-effectively manufactured.

It is an object of the present invention to provide an eyeglass as described above which may be manufactured with a variety of lens shapes.

DETAILED DESCRIPTION OF THE INVENTION

Figure 1:
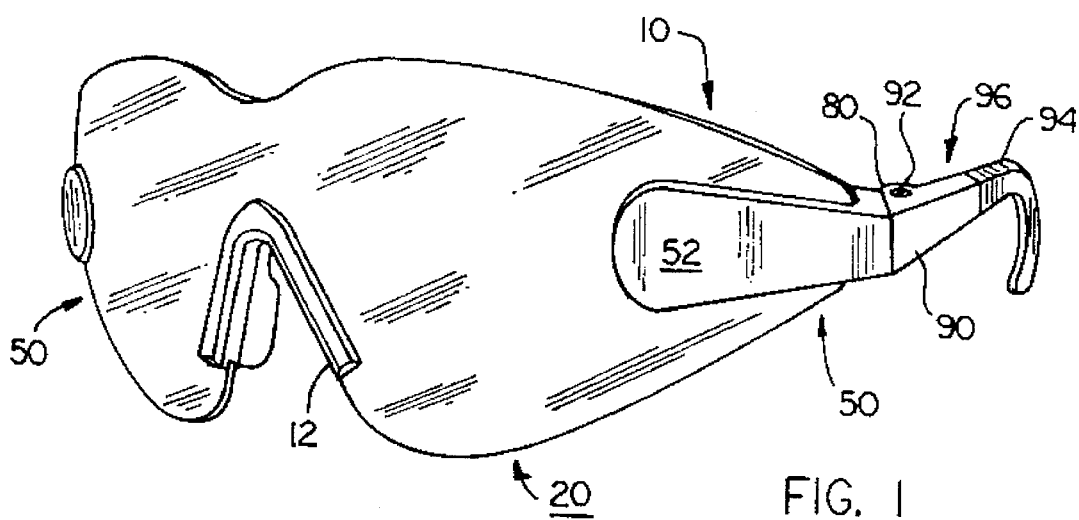
FIG. 1 is a perspective view of an eyeglass according to the present invention.

With reference to FIG. 1, an eyeglass according to the present invention and generally denoted by the numeral 10 is shown therein. Eyeglass 10 includes lens 20 to which is secured nose piece 12 and temple/lens connectors 50. For the sake of brevity and clarity, only one-half of eyeglass 10 will be hereafter discussed. However, it will be appreciated that eyeglass 10 is symmetric and that the components, features, and operations discussed hereinbelow with respect to the right half of eyeglass 10 are equally applicable to the left side of eyeglass 10.

Temple 96 includes connector piece 90 and ear piece 94. Connector piece 90 is hingedly secured to temple/lens connector 50 by means of boss 80, which forms a part of temple/lens connector 50, and screw 92. Ear piece 94 is mounted within connector piece 90 so as to be slidably removable and adjustable.

Figure 2:
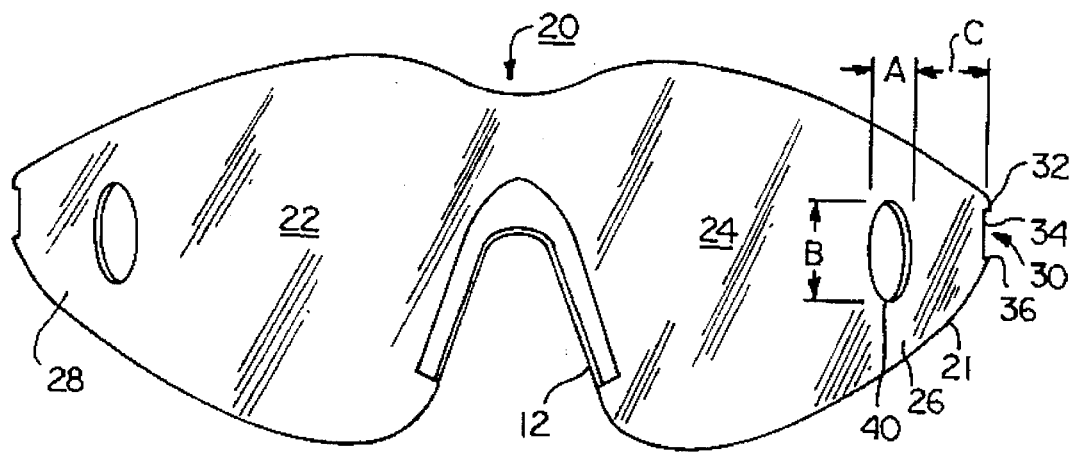
FIG. 2 is a front plan view of a lens forming a part of the eyeglass of the present invention according to a first embodiment.

With reference to FIG. 2, a lens 20 according to a first embodiment of the present invention is shown therein. Lens 20 includes panes 22, 24 which preferably form a single continuous curved pane. Panes 22 and 24 include end regions 28 and 26, respectively, which are adapted to receive and secure temple/lens connectors 50 as described below. Although the discussion below addresses only the features of pane 24, it will be appreciated that pane 22 is the mirror image of pane 24.

Pane 24 includes aperture 40 and notch 30 formed therein. Aperture 40 has a first dimension A, preferably in the range of 1.6 mm to 7.6 mm. Aperture 40 further includes a second dimension B which is greater than dimension A and is preferably in the range of 5 mm to 11 mm. Notch 30 is defined by upper tang 32, lower tang 36, and seat edge 34 formed in the peripheral side edge 21 of pane 24. The shortest distance between aperture 40 and notch 30 is a dimension C. Dimension C is preferably in the range of 6.6 mm to 12.6 mm.

Lens 20 is preferably formed from polycarbonate. Lens 20 may be formed by injection molding, die cutting, or any other suitable process. It will be appreciated from the foregoing and the discussion hereinafter that a variety of finishes, colorings, and styles may be used.

Figure 3:
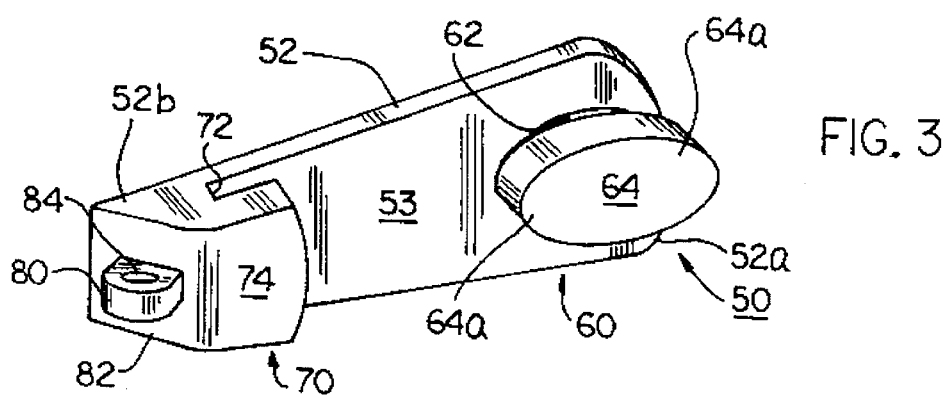
FIG. 3 is a perspective view of a temple/lens connector according to the present invention.
Figure 4:
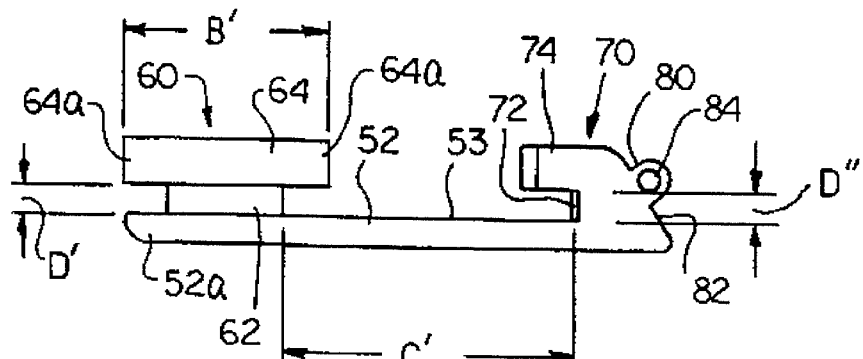
FIG. 4 is a top plan view of the temple/lens connector of the present invention.
Figure 5:
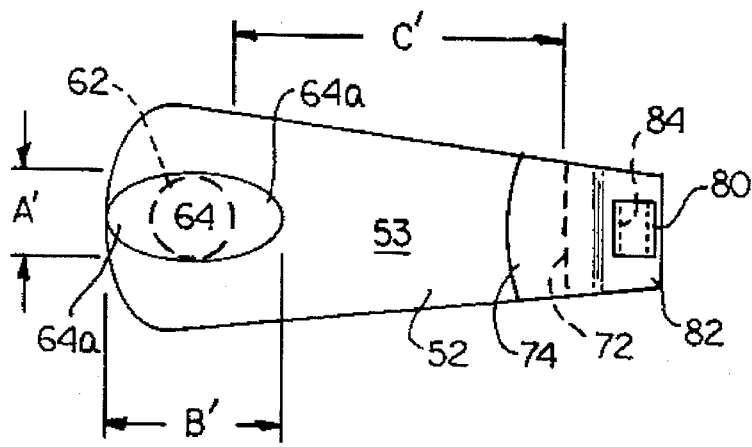
FIG. 5 is a rear elevational view of the temple/lens connector of the present invention.

As best seen in FIGS. 3–5, temple/lens connector 50 includes base member 52, cam structure 60, and clip structure 70. Base member 52 has first end 52a, second end 52b, and interior surface 53. Cam structure 60 includes shaft 62 secured to and extending rearwardly from interior surface 53, and cam head 64 secured to the end of shaft 62. Cam head 64 includes extensions 64a. Clip structure 70 includes lip 74 and abutment 72. Boss 80 extends from second end 52b of base member 52 and is adapted to pivotally receive temple connector piece 90 with screw 92 passing through hole 84. Abutment 82 is provided to engage and brace the end of temple connector piece 90. Preferably, and as shown, abutment 82 is disposed at an angle of less than 90° with respect to interior surface 53 so that when temple/lens connector 50 is mounted on rearwardly curving lens 20 as shown, it will provide a surface substantially parallel to the length of the lens so that conventional temples may be mounted on temple/lens connector 50.

Temple/lens connector 50 and connector piece 90 are preferably formed from nylon, such as nylon 6/6. Temple/lens connector 50 and connector piece 90 may be formed by injection molding. Materials other than nylon may be used, for example, polypropylene or ABS.

With particular reference to FIGS. 4 and 5, four dimensions of temple/lens connector 50 may be chosen so as to aid in the proper securement of temple/lens connector 50 to lens 20. It should first be noted that head 64 is preferably shaped generally the same as aperture 40 of lens 20. Dimension A', the width of head 64, is preferably slightly smaller than dimension A of aperture 40. More preferably, dimension A' is preferably approximately 0.05 mm to 0.15 mm smaller than dimension A. Likewise, dimension B', the length of head 64, is preferably slightly smaller than dimension B of aperture 40. More preferably, dimension B' is preferably approximately 0.05 mm to 0.15 mm smaller than dimension B. Dimension B' is greater than dimension A.

Abutment 72 is preferably curved so as to facilitate the passage of abutment 72 over lower tang 36. Dimension C', the shortest distance between shaft 62 and abutment 72, is preferably substantially the same as dimension C. Abutment 72 is preferably from about 0.5 mm to about 4 mm longer than seat edge 34.

Figure 6:
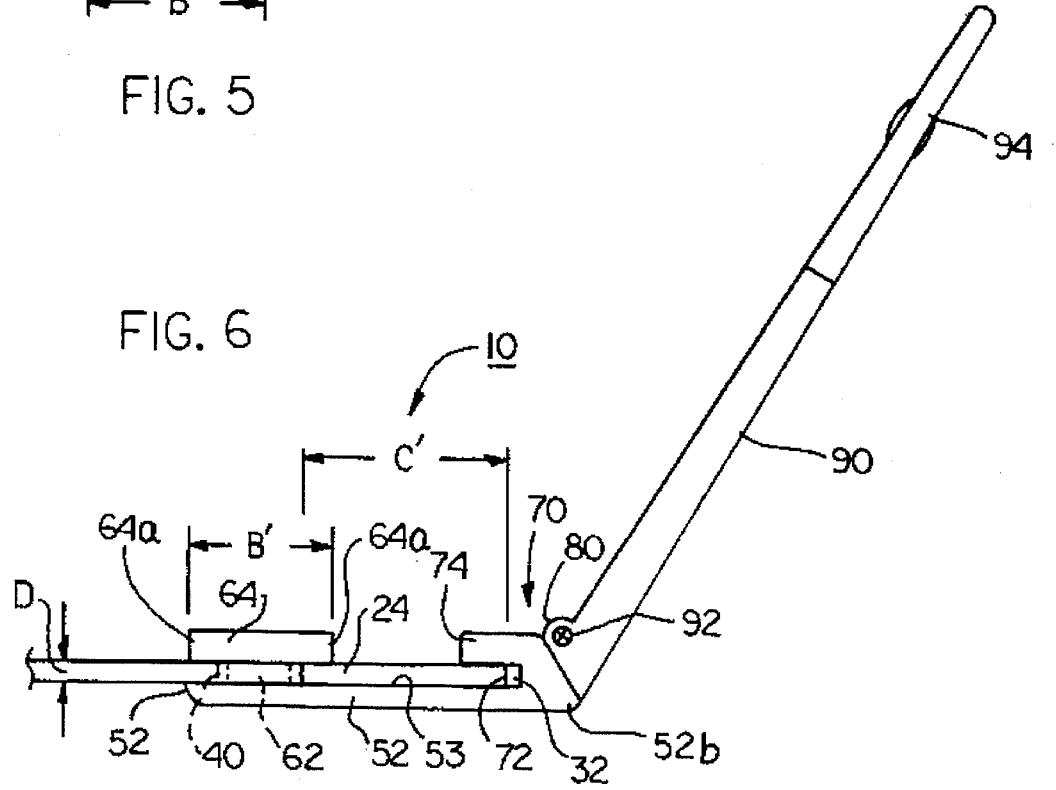
FIG. 6 is a top plan view of a portion of the eyeglass of the present invention wherein the temple/lens connector is mounted on the lens.

With reference to FIGS. 4 and 6, lens 20 will preferably have a thickness D in the range of 1 mm to 2.2 mm. Temple/lens connector 50 preferably has a thickness D' which is slightly larger than thickness D. Further, temple/lens connector 50 has a thickness or gap D" which is slightly less than the thickness D of the lens adjacent lip 74 when connector 50 is in the locked position, thickness D" preferably being approximately 0.1 mm to 0.5 mm less than thickness D at that point.

With further reference to FIG. 6, eyeglass 10 is shown therein with temple/lens connector 50 secured to lens 20 in a locked position. Movement of temple/lens connector 50 forward and away from lens pane 24 is prohibited by extensions 64a of head 64 which extend outwardly beyond the periphery of aperture 40 and lip 74 which extends inwardly beyond peripheral side edge 21. Movement of temple/lens connector 50 and temple 96 above the top edge of pane 20 is prohibited by upper tang 32 which abuts the upper surface of second end 52b of temple/lens connector 50. Downward rotation of temple 96 is restricted by the interface of abutment 72 and lower tang 36, the distance between aperture 40 and the outer tip of lower tang 36 being greater than the distance between shaft 62 and abutment 92 (i.e., dimension C'). Preferably, at least one of the lens and the temple/lens connector are formed of a resilient material such that second end 52 of temple/lens connector 50 may be selectively slid over lower tang 36 as desired. Moreover, abutment 72 may be formed so as to define a concave surface, further facilitating the sliding of temple/lens connector 50 over lower tang 36. As noted above, dimension C' is substantially the same as dimension C, thereby providing a secure fit between abutment 72 and notch 30 and reducing the tendency for relative movement of the components. Also, as noted above, dimension D" is slightly smaller than the lens thickness adjacent lip 74 when connector 50 is in the locked position, thereby tending to cantilever or spring lip 74 to provide an interference fit which resists relative movement of the components, as well.

Figure 7:
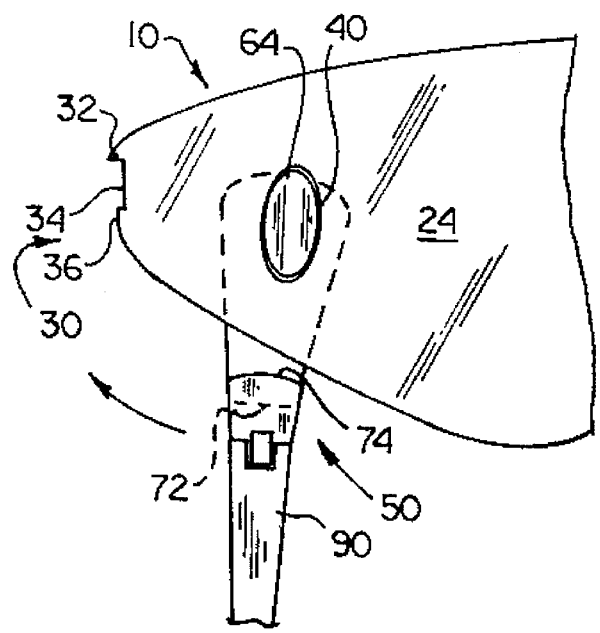
FIG. 7 is a rear plan view of the eyeglass of the present invention showing the hinge connector in the unlocked position.
Figure 8:
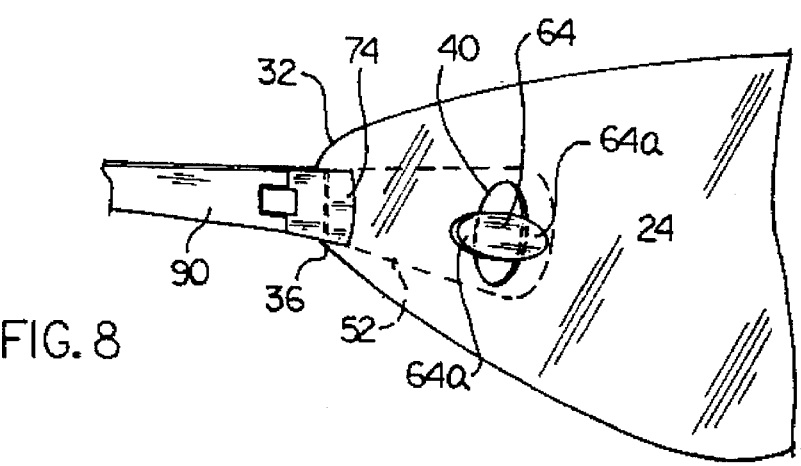
FIG. 8 is a rear plan view of the eyeglass of the present invention showing the hinge connector in a locked position.

With reference to FIGS. 7 and 8, assembly of eyeglass 10 is shown therein. As best seen in FIG. 7, temple/lens connector 50 is first placed in the unlocked position. The unlocked position is achieved by aligning head 64 with aperture 40 and inserting head 64 through aperture 40 so that extensions 64a extend beyond the periphery of aperture 40 and shaft 62 is disposed, at least partially, within aperture 40. The lens should be configured so as to provide clearance between lip 74 and the edge of the lens when the cam head is aligned with the aperture. Next, temple/lens connector 50 is placed in the locked position as best seen in FIG. 8. The locked position is attained by rotating temple/lens connector 50 upwardly about shaft 62 as noted by the arrow in FIG. 7. Temple/lens connector 50 is rotated until at least a portion of abutment 72 passes over lower tang 36 and the top surface of second end 52b of base member 52 abuts the lower surface of upper tang 32. Preferably, as noted above, dimension C' is less than the distance between aperture 40 and the outer tip of lower tang 36 so that temple/lens connector 50 snaps into notch 30 once a portion of abutment 72 passes over lower tang 36.

Temple/lens connector 50 may be removed from pane 24 by reversing the above-described steps. That is, temple/lens connector 50 is rotated downwardly over lower tang 36 and about shaft 62 until head 64 is aligned with aperture 40. Then, temple/lens connector 50 is pivoted or pulled outwardly and away from pane 24.

Preferably, temple/lens connector 50 is formed so as to be symmetric about its length so that it may be secured to left pane 22 or right pane 24.

It will be further appreciated that the temple/lens connector may be configured such that the base member is positioned adjacent the interior surface of the lens when it is mounted thereon.

Figure 9:
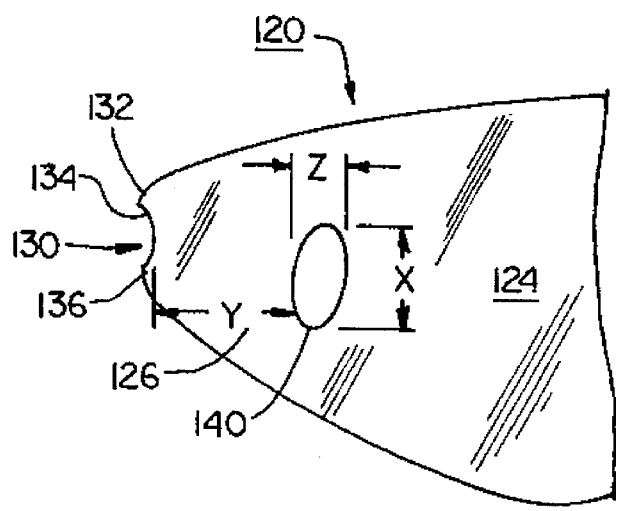
FIG. 9 is a fragmentary front elevational view of the lens of an eyeglass according to a second embodiment of the present invention.

With reference to FIG. 9, lens 120 for forming an eyeglass according to a second embodiment is shown therein. Lens 120 likewise includes a pane 124 having an aperture 140 and a notch 130 formed therein. Aperture 140 has a dimension Z corresponding to dimension A of lens 20 and a dimension X corresponding to dimension B of lens 20. Notch 130 is defined by upper tang 132, seat edge 134, and lower tang 136. Lens 120 differs from lens 20 of the first embodiment in that seat edge 134 is concavely arcuate rather than straight. Operation and construction of lens 120 and the eyeglass of which it forms a part is the same as described above with respect to lens 20.

Certain improvements and modifications will be readily apparent to those skilled in the art upon a reading of the foregoing description of the preferred embodiments. For example, it is not necessary that aperture 40 and head 64 be formed as ovals as shown in the preferred embodiments. Aperture 40 and head 64 may be formed as rectangles or any other shape so long as head 64 may be passed through aperture 40 and, when temple 90 is properly positioned with respect to lens 20 for wearing, a portion of head 64 extends beyond the periphery of aperture 40. All such improvements and modifications are intended to come within the scope of the claims which follow.

What is claimed is:

1. A temple/lens connector for eyeglasses of the type in which the lens and temple are interchangeable and replaceable and wherein the lens includes an aperture formed therein adjacent a peripheral side edge, said temple/lens connector comprising:

a) a base member having a first end, a second end, and an interior surface;

b) a lock structure proximate said first end and projecting from said interior surface, said lock structure rotatable within the aperture and arranged and configured to secure said base member to the lens when rotated into a locked position and to allow the removal of said base member from said lens when rotated into an unlocked position; and c) wherein said lock structure includes a shaft having one end secured to said interior surface of said base member, a head formed on the other end of said shaft, said head adapted to pass through the aperture when said lock structure is in said unlocked position, and said head including extensions arranged and configured to abut a portion of the surface of the lens opposite said base member and prohibit removal of said lock structure from the aperture when said lock structure is in said locked position.

2. The temple/lens connector of claim 1 wherein said head is oval.

3. The temple/lens connector of claim 1 further including means formed on said second end of said base member for pivotally securing the temple.

4. The temple/lens connector of claim 1 wherein said lock structure is rotatable between said locked and unlocked positions about an axis defined within the aperture of the lens.

5. The temple/lens connector of claim 1 further including a clip structure formed proximate said second end of said base member, said clip structure arranged and configured to receive a portion of the peripheral side edge of the lens.

6. The temple/lens connector of claim 5 wherein said clip structure includes an abutment and a lip extending from said abutment and spaced from said base member.

7. The temple/lens connector of claim 6 wherein said lock structure includes a shaft extending from said base member, and wherein the distance between said shaft and said abutment is substantially the same as the distance between the aperture and the peripheral side edge of the lens pane adjacent said abutment when said lock structure is in said locked position.

8. The temple/lens connector of claim 6 wherein said abutment has a length greater than the length of a notch formed in the peripheral side edge of the lens.

9. An eyeglass comprising:
 a) a lens, said lens including:
  1) a peripheral side edge;
  2) a notch formed in said side edge and defined by an upper tang, a lower tang, and a seat edge formed therebetween; and
  3) an aperture formed in said lens; and
 b) a temple/lens connector, said temple/lens connector comprising:
  1) a base member having a first end, a second end, and an interior surface;
  2) a lock structure proximate said first end and projecting from said interior surface, said lock structure rotatable within said aperture and arranged and configured to secure said base member to said lens when rotated into a locked position and to allow the removal of said base member from said lens when rotated into an unlocked position; and
  3) wherein said lock structure includes a shaft having one end secured to said interior surface of said base member, a head formed on the other end of said shaft, said head adapted to pass through said aperture when said lock structure is in said unlocked position, and said head including extensions arranged and configured to abut against a portion of the surface of said lens opposite said base member and prohibit removal of said lock structure from said aperture when said lock structure is in said locked position.

10. The eyeglass of claim 9 wherein said head is oval.

11. The eyeglass of claim 9 further including means formed on said second end of said base member for pivotally securing a temple.

12. The eyeglass of claim 9 wherein said lock structure is rotatable between said locked and unlocked positions about an axis defined within said aperture of said lens.

13. The eyeglass of claim 9 further including a clip structure formed proximate said second end of said base member, said clip structure arranged and configured to receive a portion of said peripheral side edge of said lens.

14. The eyeglass of claim 13 wherein said clip structure includes an abutment and a lip extending from said abutment and spaced from said base member.

15. The eyeglass of claim 14 wherein said lock structure includes a shaft extending from said base member, and wherein the distance between said shaft and said abutment is substantially the same as the distance between said aperture and said peripheral side edge of said lens adjacent said abutment when said lock structure is in said locked position.

16. The eyeglass of claim 14 wherein said abutment has a length greater than the length of a notch formed in the peripheral side edge of said lens.

17. The eyeglass of claim 9 wherein said seat edge comprises a straight, vertical edge between said upper and lower tangs, and wherein said upper tang extends farther than said lower tang from said aperture whereby said upper tang arrests upward movement of said base member and said lower tang frictionally resists downward movement of said base member.

18. The eyeglass of claim 9 wherein said seat edge comprises a curvilinear edge extending substantially vertically between said upper and lower tangs, and wherein said upper tang extends farther than said lower tang from said aperture whereby said upper tang arrests upward movement of said base member and said lower tang frictionally resists downward movement of said base member.

19. The eyeglass of claim 9 wherein said aperture is oval.

20. A lens support assembly for eyeglasses of the type in which the eyeglass lens and temple are interchangeable and replaceable and wherein the lens includes an aperture formed therein adjacent a peripheral side edge, said lens support assembly comprising:
 a) a temple/lens connector including:
  i) a base member having a first end, a second end, and an interior surface; and
  ii) a lock structure proximate said first end and projecting from said interior surface, said lock structure rotatable within the aperture and arranged and configured to secure said base member to the lens when rotated into a locked position and to allow the removal of said base member from said lens when rotated into an unlocked position;
 b) a temple;
 c) means formed on said second end of said base member for pivotally securing said temple; and
 d) wherein said lock structure includes a shaft having one end secured to said interior surface of said base member, a head formed on the other end of said shaft, said head adapted to pass through the aperture when said lock structure is in said unlocked position, and said head including extensions arranged and configured to abut a portion of the surface of the lens opposite said base member and prohibit removal of said lock structure from the aperture when said lock structure is in said locked position.

21. The lens support assembly of claim 20 wherein said head is oval.

22. The lens support assembly of claim 20 wherein said temple includes a connector piece and an earpiece.

23. The lens support assembly of claim 20 wherein said lock structure is rotatable between said locked and unlocked positions about an axis defined within the aperture of the lens.

24. The lens support assembly of claim 20 further including a clip structure formed proximate said second end of said base member, said clip structure arranged and configured to receive a portion of the peripheral side edge of the lens.

25. The lens support assembly of claim 24 wherein said clip structure includes an abutment and a lip extending from said abutment and spaced from said base member.

26. The lens support assembly of claim 25 wherein said lock structure includes a shaft extending from said base member, and wherein the distance between said shaft and said abutment is substantially the same as the distance between the aperture and the peripheral side edge of the lens pane adjacent said abutment when said lock structure is in said locked position.

27. The lens support assembly of claim 25 wherein said abutment has a length greater than the length of a notch formed in the peripheral side edge of the lens.

28. A temple/lens connector for eyeglasses of the type in which the lens and temple are interchangeable and replaceable and wherein the lens includes an aperture formed therein adjacent a peripheral side edge, said temple/lens connector comprising:

a) a base member having a first end, a second end, and an interior surface;

b) a lock structure proximate said first end and projecting from said interior surface, said lock structure rotatable within the aperture and arranged and configured to secure said base member to the lens when rotated into a locked position and to allow the removal of said base member from said lens when rotated into an unlocked position;

c) a clip structure formed proximate said second end of said base member, said clip structure arranged and configured to receive a portion of the peripheral side edge of the lens, said clip structure including an abutment and a lip extending from said abutment and spaced from said base member, and wherein said abutment has a length greater than the length of a notch formed in the peripheral side edge of the lens.

29. An eyeglass comprising:

a) a lens, said lens including:
 1) a peripheral side edge;
 2) a notch formed in said side edge and defined by an upper tang, a lower tang, and a seat edge formed therebetween; and
 3) an aperture formed in said lens; and b) a temple/lens connector, said temple/lens connector comprising:
 1) a base member having a first end, a second end, and an interior surface;
 2) a lock structure proximate said first end and projecting from said interior surface, said lock structure rotatable within said aperture and arranged and configured to secure said base member to said lens when rotated into a locked position and to allow the removal of said base member from said lens when rotated into an unlocked position; and
 3) a clip structure formed proximate said second end of said base member, said clip structure arranged and configured to receive a portion of said peripheral side edge of said lens, said clip structure including an abutment and a lip extending from said abutment and spaced from said base member, and wherein said abutment has a length greater than the length of said notch formed in the peripheral side edge of said lens.

30. A lens support assembly for eyeglasses of the type in which the eyeglass lens and temple are interchangeable and replaceable and wherein the lens includes an aperture formed therein adjacent a peripheral side edge, said lens support assembly comprising:

a) a temple/lens connector including:
 i) a base member having a first end, a second end, and an interior surface;
 ii) a lock structure proximate said first end and projecting from said interior surface, said lock structure rotatable within the aperture and arranged and configured to secure said base member to the lens when rotated into a locked position and to allow the removal of said base member from said lens when rotated into an unlocked position;

b) a temple;

c) means formed on said second end of said base member for pivotally securing said temple; and d) a clip structure formed proximate said second end of said base member, said clip structure arranged and configured to receive a portion of the peripheral side edge of the lens, said clip structure including an abutment and a lip extending from said abutment and spaced from said base member and wherein said abutment has a length greater than the length of a notch formed in the peripheral side edge of the lens.

31. An eyeglass comprising:

a) a lens, said lens including:
 1) a peripheral edge;
 2) an inner surface;
 3) an outer surface; and
 4) an aperture formed in said lens;

b) a temple/lens connector, said temple/lens connector comprising:
 1) a base member having a first end, a second end, an interior surface, and an upper free edge and a lower free edge each extending between said first and second ends; and
 2) a lock structure proximate said first end and projecting from said interior surface, said lock structure rotatable within said aperture and arranged and configured to secure said base member to said lens when said temple/lens connector is rotated into a locked position and to allow the removal of said base member from said lens when rotated into an unlocked position;
 3) a clip structure formed on said second end of said base member arranged and configured to receive a portion of said peripheral edge of said lens; and c) wherein, when said temple/lens connector is in said locked position, said interior surface of said base member lies adjacent and said upper free edge and said lower free edge are disposed adjacent only one of said inner surface of said lens and said outer surface of said lens, said upper and lower free edges do not extend beyond said peripheral edge, and only said portion of said peripheral edge adjacent said clip structure is covered by said temple/lens connector.

* * * * *